United States Patent
Coiffier et al.

(10) Patent No.: US 8,021,165 B2
(45) Date of Patent: Sep. 20, 2011

(54) ARRANGEMENT FOR THE SECURE CONNECTION OF AN ELECTRONIC DEVICE

(75) Inventors: Jeremie Coiffier, Orsay (FR); Cyril Guillemot, Saint Arnoult en Yveluines (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/809,173

(22) PCT Filed: Dec. 16, 2008

(86) PCT No.: PCT/EP2008/067642
§ 371 (c)(1),
(2), (4) Date: Aug. 30, 2010

(87) PCT Pub. No.: WO2009/083439
PCT Pub. Date: Jul. 9, 2009

(65) Prior Publication Data
US 2010/0317202 A1 Dec. 16, 2010

(30) Foreign Application Priority Data
Dec. 21, 2007 (FR) ..................................... 07 60189

(51) Int. Cl.
*H01R 33/00* (2006.01)
(52) U.S. Cl. .......................................... 439/34
(58) Field of Classification Search .................... 439/34, 439/533
See application file for complete search history.

(56) References Cited

U.S. PATENT DOCUMENTS

| 5,021,721 | A | 6/1991 | Oshita et al. |
| 5,288,141 | A * | 2/1994 | Isshiki et al. ............... 303/119.3 |
| 5,975,933 | A | 11/1999 | Yamaguchi et al. |
| 6,257,641 | B1 * | 7/2001 | Fritz et al. ................... 296/65.03 |
| 6,752,632 | B1 * | 6/2004 | Anderson et al. ............... 439/34 |
| 2007/0250242 | A1 | 10/2007 | Herges |
| 2008/0274628 | A1 | 11/2008 | Chauvelier et al. |

FOREIGN PATENT DOCUMENTS

| DE | 197 31 455 | 1/1998 |
| DE | 10 2004 039998 | 3/2006 |
| GB | 2 226 285 | 6/1990 |
| WO | 2007 003803 | 1/2007 |

* cited by examiner

Primary Examiner — Phuong K Dinh
(74) Attorney, Agent, or Firm — Oblon, Spivak, McClelland, Maier & Neustadt, L.L.P.

(57) ABSTRACT

An arrangement for electrically connecting a motor vehicle accessory to an electrical energy source and to at least one electronic device of the vehicle, including: at least one power connector capable of being mounted on the accessory in a connected position for connecting the accessory to the electrical energy source, and at least one signal connector capable of being mounted on the accessory in a connected position for connecting the accessory to the electric device of the vehicle. The electrical connection of the accessory is performed on a support arranged below the steering column close to the region of a driver's feet. A motor vehicle electric power-assisted steering column equipped with such an arrangement of connectors for the electrical connection thereof.

6 Claims, 2 Drawing Sheets

ARRANGEMENT FOR THE SECURE CONNECTION OF AN ELECTRONIC DEVICE

Figure 1:
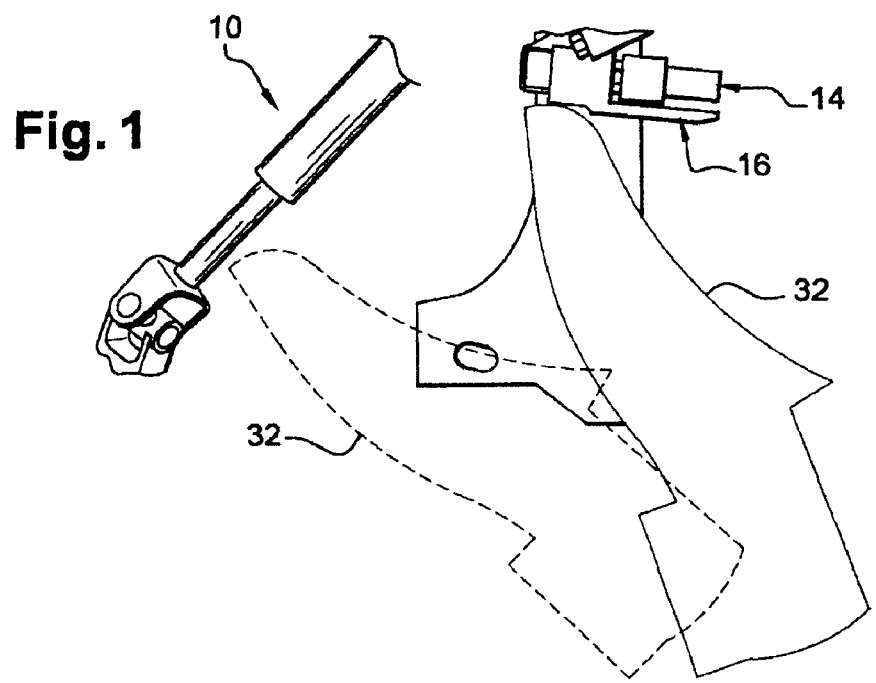

The present invention relates to an arrangement for the secure connection of an electronic device to at least two other electronic devices. The invention proposes an arrangement for the electrical connection of a motor vehicle accessory, particularly an electric assisted steering device, to a power source and to at least one other electronic device of the vehicle, making it possible to limit the risks of disconnection.

The invention proposes more particularly an arrangement for the electrical connection of a motor vehicle accessory to an electric power source and to at least one electronic device of the vehicle, of the type that comprises a power connector which is capable of being mounted on the accessory in a connected position for the connection of the accessory to the electric power source, a signal connector which is capable of being mounted on the accessory in a connected position for the connection of the accessory to said electronic device of the vehicle.

Such an arrangement is in particular used for the electrical connection of the assisted steering device of a motor vehicle to the battery of the vehicle, on the one hand, and to one or more sensors arranged in the vehicle, on the other hand.

According to a known embodiment, the mounting and locking of the power connector and of the signal connector are systematically carried out by an operator. However, this installation on the computer poses the problem of a blind connection to the system because the computer zone is not easy to access and is very narrow. This therefore increases the risk that the power and signal connectors are not properly connected and that consequently they can disconnect at any time from the assisted steering device and cause the loss of assistance of the column.

Such a disconnection of the power connector causes the assisted steering device to stop and the driver must then provide a very powerful force to act on the steering of the vehicle.

The disconnection of the power connector can be particularly dangerous for the driver of the vehicle, particularly when it occurs while the vehicle is in motion.

The object of the invention is to propose an arrangement for the electrical connection of the assisted steering device, said arrangement also supplying the possibility of a robust connection and easy access for the operations of installation, of inspection or of maintenance by offering an additional visual verification means.

The invention achieves its object by virtue of an arrangement for the electrical connection of a motor vehicle accessory to an electric power source and to at least one electronic device of the vehicle, of the type that comprises:
  at least one power connector which is capable of being mounted on the accessory in a connected position for the connection of the accessory to the electric power source,
  at least one signal connector which is capable of being mounted on the accessory in a connected position for the connection of the accessory to said electronic device of the vehicle,
characterized in that the accessory is electrically connected to a support placed beneath the steering column close to the area of the feet of a driver.

Advantageously, the invention may also have one or more of the following features:
  the support may have a substantially U-shaped housing comprising a horizontal flat base and two side walls substantially perpendicular to the base, said housing comprising the power connector designed to be connected to the signal connector,
  the support may also comprise an extension plate extending rearward and being substantially in the same plane as the base so as to protect the connection of the power connector to the signal connector from its external environment, and
  the accessory may be a motor vehicle electronic assisted steering device.

The invention also relates to a motor vehicle electric assisted steering column fitted with such an arrangement of connectors for its electrical connection.

Figure 2:
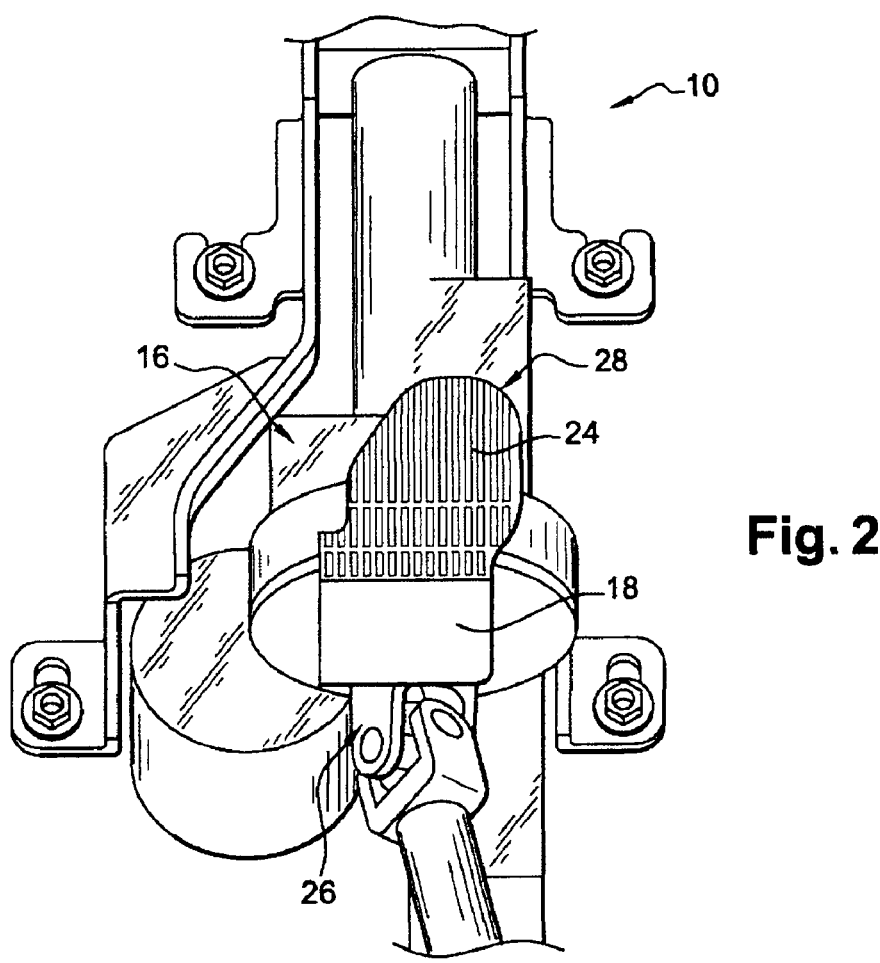
Figure 3:
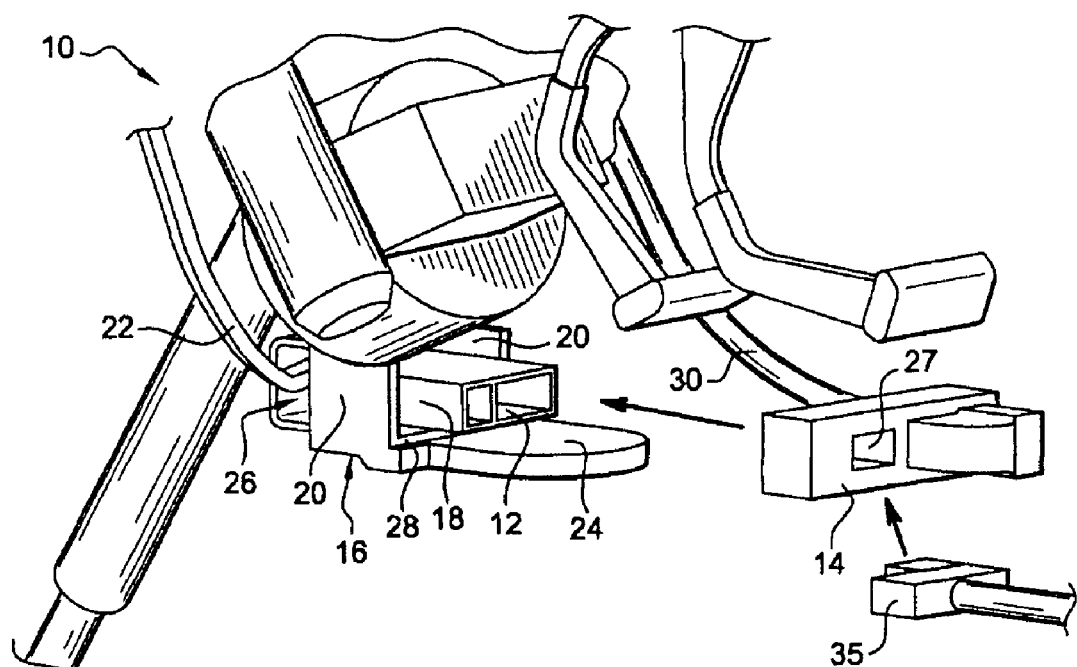

Other features and advantages of the invention will clearly appear on reading the following description in connection with the appended figures in which:

FIG. 1 represents a side view in perspective of the arrangement of the support beneath the steering column according to the invention, the foot of a driver being present, FIG. 2 represents a bottom view in perspective of the connector support according to the invention, and FIG. 3 represents a view in perspective of the arrangement of the support beneath the steering column according to the invention and at another angle.

In the following description, identical, similar or analogous elements will be designated by the same reference numbers.

Similarly, in the following description, "upper" will be a face of an element that is oriented vertically toward the top of the vehicle and "lower" will be any face opposite to said "upper" face. Finally, the terms "front" and "rear" will be designated with reference to the conventional direction of travel of a motor vehicle.

With reference to the figures, a motor vehicle accessory 10 is shown which consists, for example, of a vehicle electric assisted steering device.

In a conventional manner, the assisted steering device 10 comprises an actuator (not shown) which acts on the steering system of the vehicle to reduce the forces that the driver has to provide on the steering wheel of the vehicle, and an electronic control device (not shown) to determine which action must be carried out by the actuator, as a function of various operating parameters of the vehicle, such as, for example, its speed of movement.

The assisted steering device 10 is supplied with electric power originating from an electric power source, particularly from the battery of the vehicle (not shown), and its electronic control device is electrically connected to one or more electronic devices of the vehicle (not shown) such as for example speed sensors and sensors sensing the position of the steering wheel in order to receive information relating to the operating parameters of the vehicle. The assisted steering device 10 is connected to the electric power source by means of a first male connector 12 that will hereinafter be called the "male power connector" which is connected to a "female power connector" 14 on the column. A signal connector 35 is connected to the "female power connector" 14 in a housing 27 that is present on said connector 14.

The power connector 12 is capable of being mounted on a support 16 fixed to the assisted steering device 10 in a connected position in which the assisted steering device 10 is connected to the battery of the vehicle.

More precisely, the support is placed and directly fixed beneath the steering column close to the area of the feet of a driver but at a sufficient distance for the latter not to bump into the support and risk separating it from the steering column. The distance is given by the volume of the feet calculated theoretically according to their ergonomics and their range of movement when a driver drives a motor vehicle. The support is fixed by means of screws, preferably, beneath the casing of the column for reasons of ergonomics on installation.

The support has a substantially U-shaped housing comprising a flat and horizontal base 18 and two side walls 20 substantially perpendicular to the base. The support, when it is secured to the steering column, therefore has a front access 26 and a rear access 28 to the connector placed on said support and more precisely on the base 18. Specifically, by virtue of this configuration, the wiring loom 22 of the connector 12 extends from the electric power source of the vehicle to the connector 12 via the front access of the support. Therefore, according to the invention, the connector 12 positioned on the base 18 is perfectly protected laterally from the environment, by virtue of the walls 20, in order to prevent a disconnection of the connector 12 from the connector 14 and of the connector 14 from the connector 35, the connection between the connector 12 and the connector 14 on the one hand and the connector 14 and the connector 35 on the other hand being carried out via the rear access 28 of the support 16. Moreover, it should be noted that, according to the embodiment of the invention, said support 16 comprising the power connector 12 is delivered as such with the steering column before the steering column is finally installed on the vehicle. It therefore forms, according to the invention, an integral part of the steering column.

The support also comprises an extension plate 24 extending rearward and being substantially in the same plane as the base 18 so as to protect the connection of the male power connector 12 to the female power connector 14 and the signal connector 35 from its external environment. Specifically, by virtue of this extension plate, the foot of the driver cannot disconnect the connectors 12, 14 and 35 since the connection will be inaccessible from below. Moreover, its length will make it possible to support the wiring loom 30 of the connector 14 in order to prevent it from coming into contact, for example, with the feet 32 of a driver. FIG. 1 moreover illustrates the ergonomics of the feet of a driver and the ranges of movement that can occur when the driver is seated in his seat and drives.

Therefore, an operator wishing to connect the male power connector 12 to the female power connector 14 and to the signal connector 35 must plug the male connector 12 into the female connector 14 placed on the support and then plug the power connector 35 into the housing 27 of the female connector 14 while gaining access thereto through the passenger compartment of the vehicle.

Therefore, by virtue of this arrangement of the connector support, the operator will have easy access to the support and will be able to visually ensure that the connectors 12, 14 and 35 are properly connected, the operation of viewing the connection providing a verification means that is complementary to a connection made blind and in which the sense of touch is the only verification means. Consequently, the mounting operations will be made more reliable and the inspection or maintenance operations will be much less constrictive since the connectors will be easily and rapidly accessible.

It should be noted that, to ensure the reliability of the connection, a locking means may be present on the connectors 12, 14 and 35.

According to the invention, other connectors may be added to this support depending upon requirements.

The device according to the invention therefore allows a very secure, easy and rapid connection of motor vehicle electric assisted steering.

The invention claimed is:

1. An arrangement for electrical connection of a motor vehicle accessory to an electric power source and to at least one electronic device of the vehicle, comprising:
    at least one power connector capable of being mounted on the accessory in a connected position for the connection of the accessory to the electric power source; and
    at least one signal connector capable of being mounted on the accessory in a connected position for the connection of the accessory to the electronic device of the vehicle,
    wherein the accessory is electrically connected to a support placed beneath a steering column close to an area of feet of a driver.

2. The arrangement as claimed in claim 1, wherein the support is placed beneath a casing of the steering column.

3. The arrangement as claimed in claim 1, wherein the support comprises a substantially U-shaped housing comprising a horizontal flat base and two side walls substantially perpendicular to the base, the housing comprising the power connector configured to be connected to the signal connector.

4. The arrangement as claimed in claim 3, wherein the support further comprises an extension plate extending rearward and being substantially in a same plane as the base so as to protect connection of the power connector to the signal connector from its external environment.

5. The arrangement as claimed in claim 1, wherein the accessory is a motor vehicle electronic assisted steering device.

6. An electric assisted steering column of a motor vehicle, which column comprises an arrangement for its electrical connection as claimed in claim 1.

* * * * *